United States Patent
Bu et al.

(10) Patent No.: US 11,686,453 B2
(45) Date of Patent: Jun. 27, 2023

(54) OPTICAL ELEMENT AND LIGHT DISTRIBUTING MODULE

(71) Applicants: SUZHOU OPPLE LIGHTING CO., LTD., Suzhou (CN); OPPLE LIGHTING CO., LTD., Shanghai (CN)

(72) Inventors: Chenxi Bu, Jiangsu (CN); Yisheng Xiao, Jiangsu (CN)

(73) Assignees: Suzhou Opple Lighting Co., Ltd., Jiangsu (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 17/489,700

(22) Filed: Sep. 29, 2021

(65) Prior Publication Data
US 2022/0018518 A1    Jan. 20, 2022

Related U.S. Application Data

(63) Continuation of application No. PCT/CN2020/080497, filed on Mar. 20, 2020.

(51) Int. Cl.
*F21V 7/04*    (2006.01)
*F21V 7/00*    (2006.01)
(Continued)

(52) U.S. Cl.
CPC ............ *F21V 7/048* (2013.01); *F21V 7/0091* (2013.01); *F21V 7/041* (2013.01); *F21S 41/322* (2018.01);
(Continued)

(58) Field of Classification Search
CPC ........ F21V 7/0091; F21V 7/041; F21V 7/048; F21V 13/04; F21V 5/008; G02B 5/09; G02B 17/006; F21S 43/315; F21S 41/322
See application file for complete search history.

(56) References Cited

U.S. PATENT DOCUMENTS

| | | | |
|---|---|---|---|
| 8,430,536 B1* | 4/2013 | Zhao | F21V 5/04 |
| | | | 362/327 |
| 10,859,238 B2* | 12/2020 | Zhu | F21V 7/048 |

(Continued)

FOREIGN PATENT DOCUMENTS

| | | | | |
|---|---|---|---|---|
| CN | 103608702 A | * | 2/2014 | ......... G02B 19/0028 |
| CN | 204739534 U | | 11/2015 | |

(Continued)

OTHER PUBLICATIONS

Machine Translation of GB-2540277-A retrieved from the FIT database of PE2E Search. (Year: 2022).*

(Continued)

*Primary Examiner* — Colin J Cattanach
(74) *Attorney, Agent, or Firm* — Arch & Lake LLP

(57) ABSTRACT

The present disclosure discloses an optical element and a light distributing module. The optical element includes an optical element body provided with a light incident surface and a light emergent surface; the optical element body is provided with a second reflective surface peripherally arranged along the light emergent surface; the second reflective surface and the light emergent surface form a cavity, and a light source is arranged in the cavity; the light incident surface is attached to a top of the light source; and along a diameter direction of the light emergent surface, the light emergent surface includes a first transparent surface, a frosted surface, and a second transparent surface, which are connected in sequence. The light distributing module includes: the above-mentioned optical element and a reflector; and along a direction away from the light emergent surface, one end of the reflector is connected with the light emergent surface.

12 Claims, 4 Drawing Sheets

(51) Int. Cl.
*F21V 13/04* (2006.01)
*F21V 5/00* (2018.01)
*F21S 41/32* (2018.01)
*G02B 5/09* (2006.01)
*F21S 43/31* (2018.01)
*G02B 17/00* (2006.01)

(52) U.S. Cl.
CPC .............. *F21S 43/315* (2018.01); *F21V 5/008* (2013.01); *F21V 13/04* (2013.01); *G02B 5/09* (2013.01); *G02B 17/006* (2013.01)

(56) References Cited

U.S. PATENT DOCUMENTS

| | | | | |
|---|---|---|---|---|
| 2005/0286252 | A1* | 12/2005 | Hanano | G03B 21/20 257/E33.071 |
| 2009/0201677 | A1* | 8/2009 | Hoelen | G02B 5/09 362/231 |
| 2010/0097809 | A1* | 4/2010 | Munro | F21V 5/045 359/627 |
| 2012/0230057 | A1* | 9/2012 | Braden | F21K 9/23 362/640 |
| 2015/0300580 | A1* | 10/2015 | Sharrah | F21L 4/005 362/187 |
| 2015/0354780 | A1* | 12/2015 | Wang | F21V 5/04 362/334 |
| 2016/0312977 | A1* | 10/2016 | Jiang | F21K 9/68 |
| 2017/0205032 | A1* | 7/2017 | Dong | G02B 19/0028 |
| 2017/0299145 | A1* | 10/2017 | Dong | F21K 9/68 |
| 2017/0307148 | A1* | 10/2017 | Sharrah | F21L 4/045 |

FOREIGN PATENT DOCUMENTS

| | | | | |
|---|---|---|---|---|
| CN | 206257491 U | | 6/2017 | |
| CN | 206608898 U | * | 11/2017 | |
| CN | 207778337 U | | 8/2018 | |
| CN | 208107991 U | | 11/2018 | |
| CN | 209371152 A | | 9/2019 | |
| DE | 202017103188 U1 | * | 10/2018 | ................ F21V 5/04 |
| EP | 2698578 A1 | * | 2/2014 | ................ F21K 9/60 |
| GB | 2540277 A | * | 1/2017 | ................ F21S 8/026 |
| SU | WO 8907280 A1 | * | 8/1989 | ................ F21V 5/04 |
| SU | WO 8909424 A1 | * | 10/1989 | ................ F21V 5/04 |
| WO | WO-2013086569 A1 | * | 6/2013 | ................ F21V 5/04 |

OTHER PUBLICATIONS

Machine Translation of CN 103608702 A retrieved from the FIT database of PE2E Search. (Year: 2022).*

Machine Translation of DE 202017103188 U1 retrieved from the FIT database of PE2E Search. (Year: 2022).*

International Search Report of PCT Application No. PCT/CN2020/ 080497 dated Jun. 19, 2020 with English translation, (4p).

* cited by examiner

OPTICAL ELEMENT AND LIGHT DISTRIBUTING MODULE

CROSS REFERENCE TO RELATED APPLICATIONS

This application is based upon and claims the priority of PCT patent application No. PCT/CN2020/080497 filed on Mar. 20, 2020 which claims priority of Chinese Patent Application No. 201920428628.X filed on Mar. 29, 2019, the entire disclosures of these applications are incorporated herein by reference in their entirety for all purposes.

TECHNICAL FIELD

The present disclosure relates to a lighting technology field, and more particularly, to an optical element and a light distributing module.

BACKGROUND

A light emitting diode (LED) spotlight bracket sometimes is in a form of a lens and a reflector. With respect to a lens solution, the lens is an optical element made of a transparent material whose surface is a portion of a spherical surface. Because the lens surface is a transparent structure and cannot form a clear cut-off line with the reflector, the lens usually has a uniform front light spot, but does not has an obvious cut-off line when a side light spot irradiates a wall vertically, which cannot meet needs of customers.

SUMMARY

Examples of the present disclosure provide an optical element and a light distributing module.

In a first aspect, the examples of the present disclosure provide an optical element, which may include an optical element body provided with a light incident surface and a light emergent surface, and the optical element body is provided with a second reflective surface peripherally arranged along the light emergent surface.

The second reflective surface and the light emergent surface may form a cavity, and a light source may be arranged in the cavity; the light incident surface may be attached to a top of the light source; and along a diameter direction of the light emergent surface, the light emergent surface comprises a first transparent surface, a frosted surface, and a second transparent surface, which may be connected in sequence.

In a second aspect, the examples of the present disclosure provide a light distributing module, which may include: the optical element according to any one of the examples described above and a reflector; and along a direction away from the light emergent surface, one end of the reflector is connected with the light emergent surface.

It is to be understood that both the foregoing general description and the following detailed description are exemplary and explanatory only and are not restrictive of the present disclosure.

BRIEF DESCRIPTION OF THE DRAWINGS

The drawings described here are used to provide a further understanding of the present disclosure and constitute a part of the present disclosure. The exemplary examples and descriptions of the present disclosure are used to explain the present disclosure, and do not constitute an improper limitation of the present disclosure. In the accompanying drawings.

DETAILED DESCRIPTION

Figure 1:
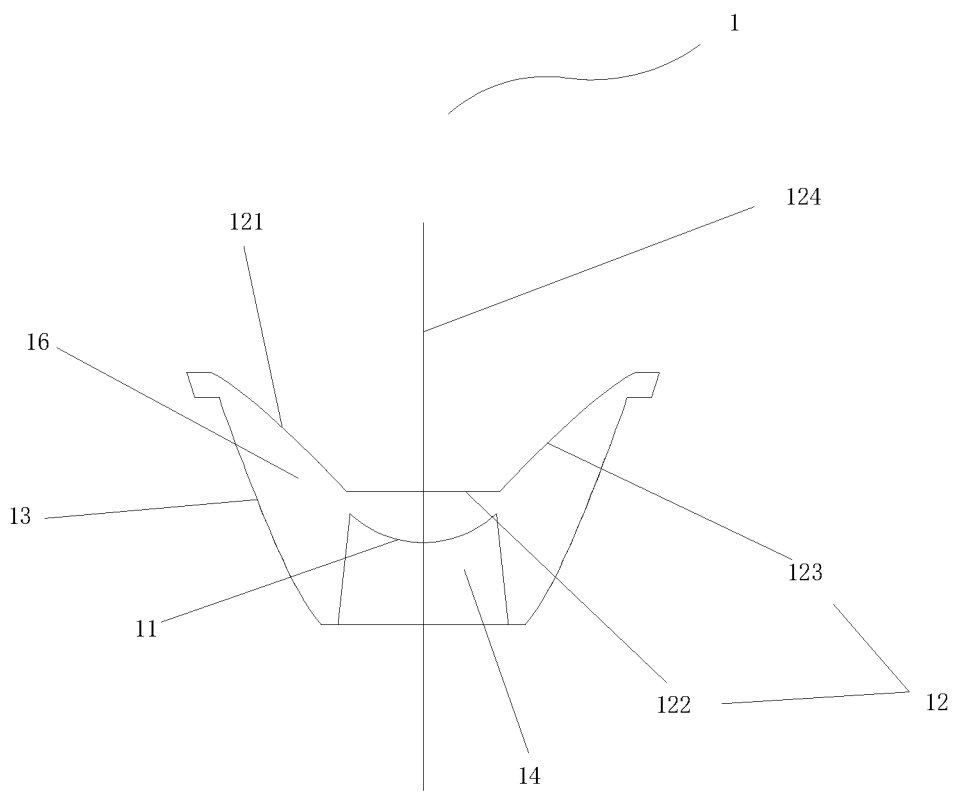
FIG. 1 is a structural schematic diagram of an optical element according to the present disclosure.

In order to make objects, technical solutions and advantages of the examples of the present disclosure apparent, the technical solutions of the examples will be described in a clearly and fully understandable way in connection with the drawings related to the examples of the present disclosure. Apparently, the described examples are just a part but not all of the examples of the present disclosure. Based on the described examples of the present disclosure, those skilled in the art can obtain other example(s), without any inventive work, which should be within the scope of the present disclosure.

Reference numerals in this disclosure may include: optical element 1, light incident surface 11, light emergent surface 12, first transparent surface 121, frosted surface 122, second transparent surface 123, central axis 124, second reflective surface 13, light source 14, cut-off line 15, cavity 16, reflector 2, reflector body 20, light entry 21, light exit 22, first reflective surface 23, sawtooth 231, axis 24, circle center 25.

As illustrated in FIG. 1, the present disclosure provides an optical element 1, which includes: an optical element body 10 provided with a light incident surface 11 and a light emergent surface 12; the optical element body 10 is provided with a second reflective surface 13 peripherally arranged along the light emergent surface 12; the second reflective surface 13 and the light emergent surface 12 form a cavity 16, and a light source 14 is arranged in the cavity 16; the light incident surface 11 is attached to a top of the light source 14; and along a diameter direction of the light emergent surface 12, the light emergent surface 12 includes a first transparent surface 121, a frosted surface 122, and a second transparent surface 123, which are connected in sequence. The present disclosure discloses the optical element 1, and the design of the frosted surface of the optical element 1 allows the optical element 1 and the reflector 2 to form a clear cut-off line 15, so as to improve uniformity of a side light spot, increase central light intensity, and improve uniformity of a front light spot. Moreover, the frosted surface is only provided in the middle of the light emergent surface 12, which may reduce the height and the length of the cut-off line 15 and reduce the size of the reflector 2, so as to meet actual application needs.

In an example of the present disclosure, the first transparent surface 121 and the second transparent surface 123 are symmetrically arranged on different sides of a central axis 124 of the frosted surface 122.

In an example of the present disclosure, the light emergent surface 12 is a flat surface.

In an example of the present disclosure, along a direction from the light emergent surface 12 to the light incident surface 11, the light emergent surface 12 is an inner concave surface. A middle portion of the inner concave surface is frosted, the inner concave surface is regarded as a surface light source, and the inner concave surface is further collimated by the reflector 2 to form an obvious cut-off line. The inner concave surface may further reduce the size of the reflector 2, reduce cost, and have strong applicability.

In an example of the present disclosure, the optical element 1 is a collimating lens.

Figure 2:
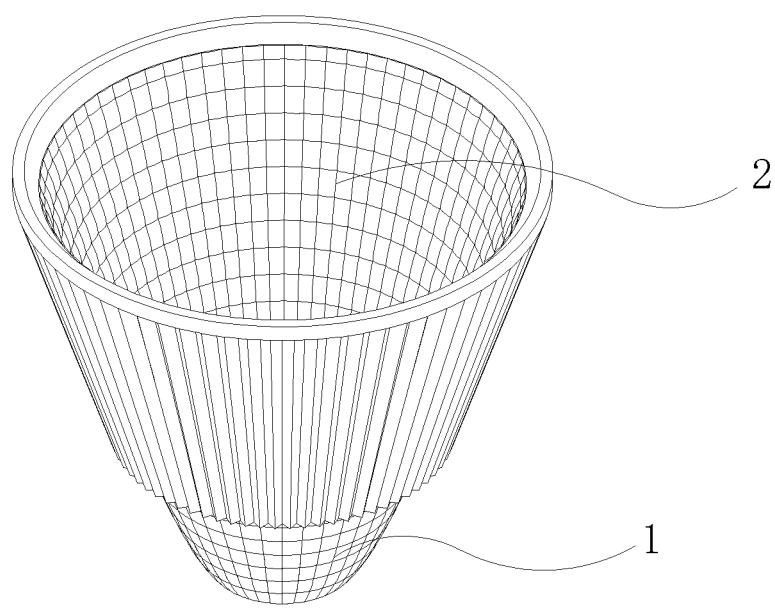
FIG. 2 is a three dimensional diagram of an example of a light distributing module according to the present disclosure.

As illustrated in FIG. 2, the examples of the present disclosure provide a light distributing module, which includes: an optical element 1 and a reflector 2; and along a direction away from the light emergent surface 12, one end of the reflector 2 is connected with the light emergent surface 12.

Figure 3:
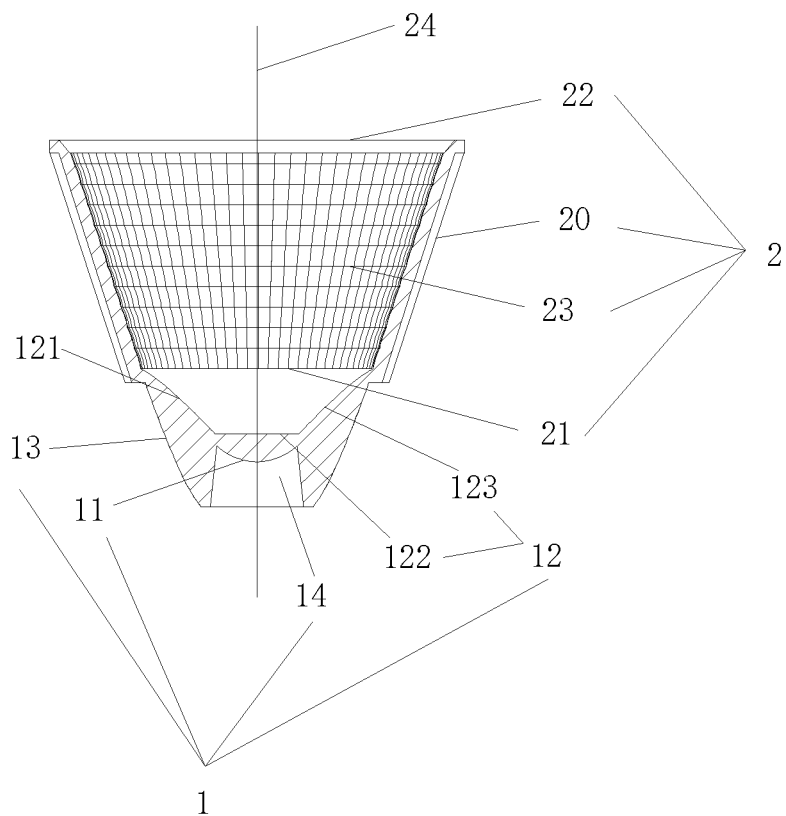
FIG. 3 is a front view of FIG. 2.

As illustrated in FIG. 2 and FIG. 3, the reflector 2 includes: a reflector body 20 provided with a light entry 21 and a light exit 22; the reflector body 20 is provided with a first reflective surface 23 which is between the light entry 21 and the light exit 22 and peripherally arranged; and the first reflective surface 23 is a serrated surface. The examples of the present disclosure disclose the reflector 2, and by setting the first reflective surface of the reflector 2 as a serrated surface, light is emitted more concentrated, and the reflection effect of the reflector 2 is improved.

Figure 4:
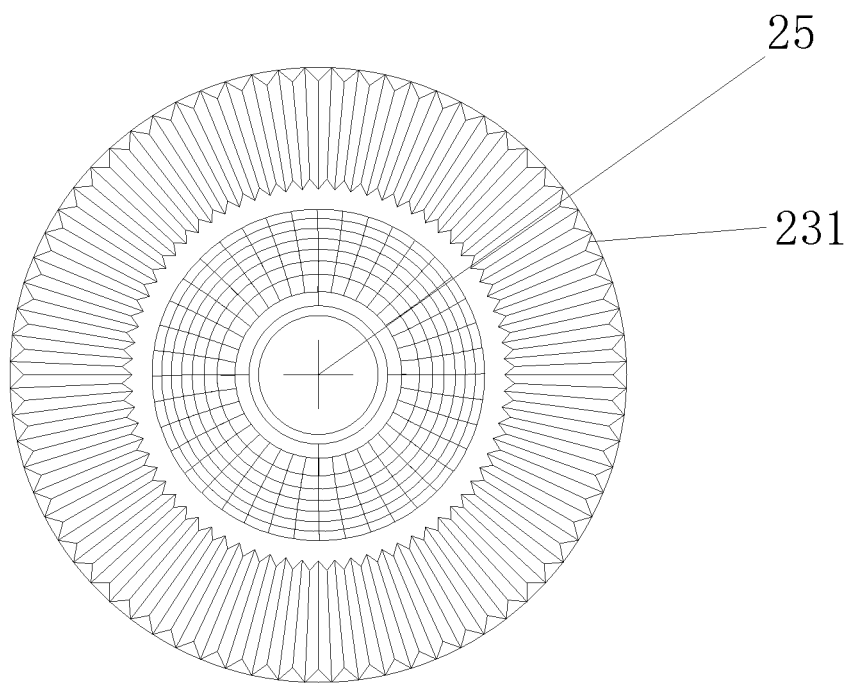
FIG. 4 is a top view of FIG. 2.

As illustrated in FIG. 4, in an example of the present disclosure, the serrated surface is formed by connecting a plurality of sawteeth 231, a central connection line of the light exit 22 and the light entry 21 serves as an axis 24, and the plurality of sawteeth 231 are arranged in a circular array along the axis 24.

In an example of the present disclosure, an included angle of each sawtooth ranges from 60° to 120°.

Figure 5:
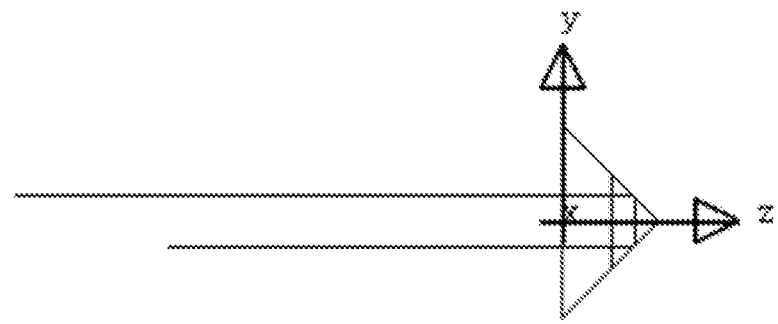
FIG. 5 is a light reflection diagram of a sawtooth.

In order to achieve a total reflection effect, in an example of the present disclosure, an included angle of each sawtooth 231 is 90°. With such setting, as illustrated in FIG. 5, in the case where a beam of light irradiates a certain surface, the beam of light will be reflected to a second surface according to a principle of total reflection, and then reflected from the second surface, and finally emergent light and incident light conform to an angle relationship of total reflection, that is, an incident angle is equal to an emergent angle, which is equivalent to specular reflection. In this way, the reflection relationship that originally occurs on one plane becomes surface reflection of two spaces, so that total reflection that could not be implement has a condition of total reflection, and light may be finally reflected out without changing the angle; and in addition, no matter how small the incident angle is, total reflection can be implemented through reflection of the two surfaces, even if light is incident on a generatrix. The light-concentrating effect is better, which can meet requirements of long-distance light concentration illumination.

In an example of the present disclosure, along a direction from the light exit 22 to the light entry 21, the light source 14 is a light source with a surface having an inner concave surface.

Figure 6:
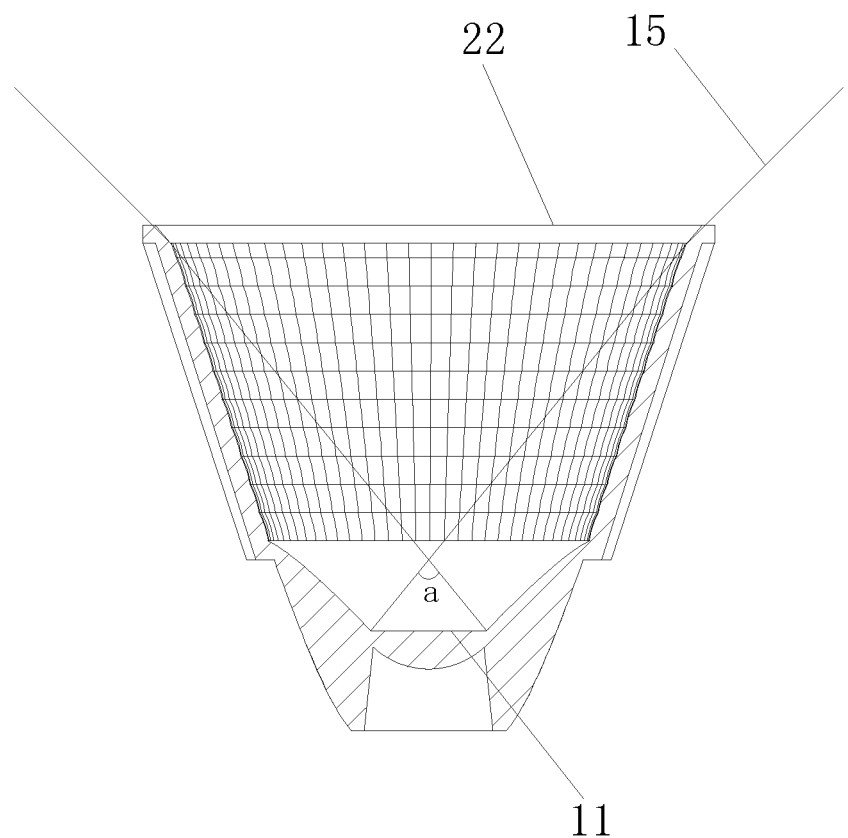
FIG. 6 is a rear view of FIG. 2.

As illustrated in FIG. 6, in an example of the present disclosure, two ends of the frosted surface 122 each form a cut-off line 15 with diagonal ends of the light exit 22, and an included angle between the two cut-off lines 15 is less than 120°. Such setting of the included angle can not only meet the actual size requirement, but also meet the requirement that the optical element 1 and the reflector 2 form an obvious and clear cut-off line 15.

Figure 7:
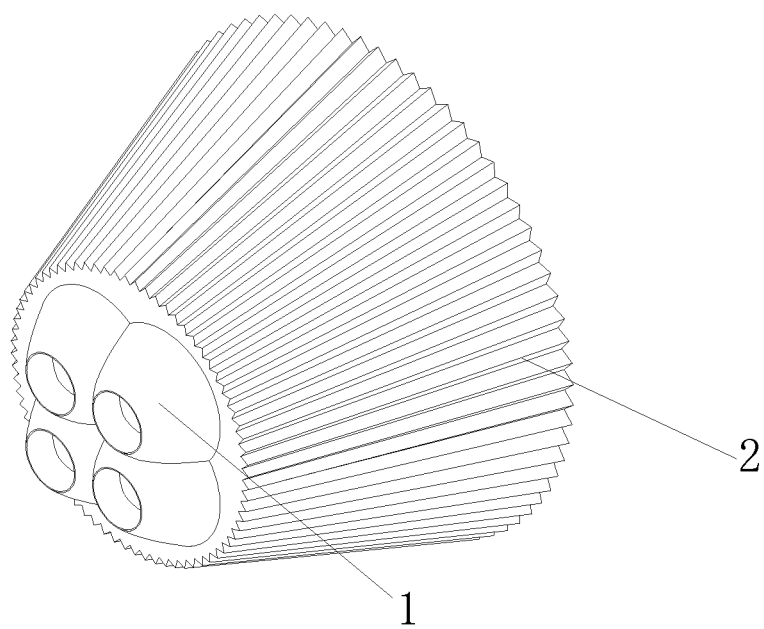
FIG. 7 is a three dimensional diagram of another example of a light distributing module according to the present disclosure.

In an example of the present disclosure, the amount of optical elements 1 is at least one, and the optical element 1 is coupled to the light entry 21 in a circular array with a center of the light entry as a circular center 25. As illustrated in FIG. 7, the amount of the optical elements 1 is 4. The design of 4 optical elements 1 reduces process requirements, and selection of the optical element 1 with a smaller specification has the advantage of low price and can save cost.

In an example of the present disclosure, the optical element 1 and the reflector 2 are an integrally formed structure. The spotlight optical element integrally formed has the advantage of low price and is simple to fabricate.

In an example of the present disclosure, materials of the optical element 1 and the reflector 2 are both transparent materials, such as transparent glass, polycarbonate (PC), polymethylmethacrylate (PMMA), etc.

In an example of the present disclosure, as illustrated in FIG. 1, a diameter of the light exit 22 is not less than a diameter of the light entry 21. In other examples, the diameter of the light exit 22 may also be less than the diameter of the light entry 21, as long as a diameter of the light incident surface 11 is smaller than the diameter of the light exit 22.

Examples of the present disclosure provide an optical element and a light distributing module.

In a first aspect, the examples of the present disclosure provide an optical element, which comprises an optical element body provided with a light incident surface and a light emergent surface, and the optical element body is provided with a second reflective surface peripherally arranged along the light emergent surface;

the second reflective surface and the light emergent surface form a cavity, and a light source is arranged in the cavity;

the light incident surface is attached to a top of the light source; and along a diameter direction of the light emergent surface, the light emergent surface comprises a first transparent surface, a frosted surface, and a second transparent surface, which are connected in sequence.

Optionally, in the above-mentioned optical element, the first transparent surface and the second transparent surface are symmetrically arranged on different sides of a central axis of the frosted surface.

Optionally, in the above-mentioned optical element, the light emergent surface is a flat surface; or/and along a direction from the light emergent surface to the light incident surface, the light emergent surface is an inner concave surface.

Optionally, in the above-mentioned optical element, the optical element is a collimating lens.

In a second aspect, the examples of the present disclosure provide a light distributing module, which comprises: the optical element according to any one of the examples described above and a reflector; and along a direction away from the light emergent surface, one end of the reflector is connected with the light emergent surface.

Optionally, in the above-mentioned light distributing module, the reflector comprises a reflector body provided with a light entry and a light exit, and the reflector body is provided with a first reflective surface which is between the light entry and the light exit and peripherally arranged;

along a direction away from the light exit, the light emergent surface is attached to the light entry;

one end of the second reflective surface is connected with the first reflective surface; and the first reflective surface is a serrated surface.

Optionally, in the above-mentioned light distributing module, the serrated surface is formed by connecting a plurality of sawteeth, a central connection line of the light exit and the light entry serves as an axis, and the plurality of sawteeth are arranged in a circular array along the axis.

Optionally, in the above-mentioned light distributing module, an included angle of each sawtooth ranges from 60° to 120°.

Optionally, in the above-mentioned light distributing module, an included angle of each sawtooth is 90°.

Optionally, in the above-mentioned light distributing module, two ends of the frosted surface each form a cut-off line with diagonal ends of the light exit, and an included angle between two cut-off lines is less than 120°.

Optionally, in the above-mentioned light distributing module, the amount of optical elements is at least one, and the optical element is coupled to the light entry in a circular array with a center of the light entry as a circular center.

Optionally, in the above-mentioned light distributing module, the optical element and the reflector are an integrally formed structure; or/and a material of the optical element and a material of the reflector are both transparent materials.

The above at least one technical solution adopted in the examples of the present disclosure can achieve advantageous effects below.

The examples of the present disclosure disclose an optical element, and by setting a portion of a light emergent surface of the optical element as a frosted surface, the optical element and the reflector can form a clear cut-off line, so as to improve uniformity of a side light spot, increase central light intensity, and increase uniformity of a front light spot.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above-mentioned examples of the present disclosure only focus on differences between various examples, and different examples can be arbitrarily combined to form more examples as long as their different optimized features are not contradictory, which will not be repeated here for brevity.

What have been described above are only examples of the present disclosure, and are not used to limit the present disclosure. For those skilled in the art, this disclosure can have various modifications and changes. Any modification, equivalent replacement, improvement, and the like made within the spirit and principle of this disclosure shall be included in the scope of this disclosure.

What is claimed is:

1. An optical element, comprising an optical element body provided with a light incident surface and a light emergent surface, wherein:
   the optical element body is provided with a second reflective surface peripherally arranged along the light emergent surface;
   the second reflective surface and the light emergent surface form a cavity, and a light source is arranged in the cavity;
   the light incident surface is attached to a top of the light source; and
   along a diameter direction of the light emergent surface, the light emergent surface comprises a first transparent surface, a frosted surface, and a second transparent surface, which are connected in sequence, the frosted surface is formed as a flat surface, a first angle formed between the first transparent surface and the frosted surface is an obtuse angle, and a second angle formed between the frosted surface and the second transparent surface is an obtuse angle, wherein the frosted surface is frosted such that each of two ends of the frosted surface forms a cut-off line with diagonal ends of a light exit of a reflector and an included angle between two cut-off lines is less than a threshold angle, the light emergent surface is attached to a light entry of the reflector and the light entry is an end of the reflector that is away from the light exit.

2. The optical element according to claim 1, wherein the first transparent surface and the second transparent surface are symmetrically arranged on different sides of a central axis of the frosted surface.

3. The optical element according to claim 1, wherein:
   the light emergent surface is a flat surface; or/and
   along a direction from the light emergent surface to the light incident surface, the light emergent surface is an inner concave surface.

4. The optical element according to claim 1, wherein the optical element is a collimating lens.

5. A light distributing module, comprising: an optical element and a reflector, wherein:
   the optical element comprises an optical element body provided with a light incident surface and a light emergent surface,
   the optical element body is provided with a second reflective surface peripherally arranged along the light emergent surface;
   the second reflective surface and the light emergent surface form a cavity, and a light source is arranged in the cavity;
   the light incident surface is attached to a top of the light source;
   along a diameter direction of the light emergent surface, the light emergent surface comprises a first transparent surface, a frosted surface, and a second transparent surface, which are connected in sequence, the frosted surface is formed as a flat surface, a first angle formed between the first transparent surface and the frosted surface is an obtuse angle, and a second angle formed between the frosted surface and the second transparent surface is an obtuse angle, wherein the frosted surface is frosted such that each of two ends of the frosted surface forms a cut-off line with diagonal ends of a light exit of the reflector and an included angle between two cut-off lines is less than a threshold angle, the light emergent surface is attached to a light entry of the reflector and the light entry is an end of the reflector that is away from the light exit.

6. The light distributing module according to claim 5, wherein:
- the reflector comprises a reflector body provided with the light entry and the light exit, and the reflector body is provided with a first reflective surface which is between the light entry and the light exit and peripherally arranged; one end of the second reflective surface is connected with the first reflective surface; and
- the first reflective surface is a serrated surface.

7. The light distributing module according to claim 6, wherein the serrated surface is formed by connecting a plurality of sawteeth, a central connection line of the light exit and the light entry serves as an axis, and the plurality of sawteeth are arranged in a circular array along the axis.

8. The light distributing module according to claim 6, Wherein an included angle of each sawtooth ranges from 60° to 120°.

9. The light distributing module according to claim 6, wherein an included angle of each sawtooth is 90°.

10. The light distributing module according to claim 6, wherein the included angle between the two cut-off lines is less than 120°.

11. The light distributing module according to claim 6, wherein the amount of optical elements is at least one, and the optical element is coupled to the light entry in a circular array with a center of the light entry as a circular center.

12. The light distributing module according to claim 6, wherein:
- the optical element and the reflector are an integrally formed structure; or/and
- a material of the optical element and a material of the reflector are both transparent materials.

* * * * *